US010538245B2

(12) United States Patent
Tan

(10) Patent No.: US 10,538,245 B2
(45) Date of Patent: Jan. 21, 2020

(54) MULTIPLE RANGE INDEPENDENTLY DISCONNECTING SMART AXLE

(71) Applicant: International Truck Intellectual Property Company, LLC, Lisle, IL (US)

(72) Inventor: Teik-Khoon Tan, Bolingbrook, IL (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 266 days.

(21) Appl. No.: 15/809,033

(22) Filed: Nov. 10, 2017

(65) Prior Publication Data
US 2019/0143973 A1 May 16, 2019

(51) Int. Cl.
*B60W 10/02* (2006.01)
*B60W 30/18* (2012.01)
(Continued)

(52) U.S. Cl.
CPC .............. *B60W 30/18* (2013.01); *B60K 17/08* (2013.01); *B60K 17/16* (2013.01); *B60K 17/36* (2013.01); *B60W 10/02* (2013.01); *B60W 10/11* (2013.01); *B60W 2520/10* (2013.01); *B60W 2520/105* (2013.01); *B60W 2530/10* (2013.01); *B60W 2540/10* (2013.01); *B60W 2550/142* (2013.01);
(Continued)

(58) Field of Classification Search
CPC ...... B60W 30/18; B60W 10/02; B60W 10/11; B60W 2710/021; B60W 2520/105; B60W 2530/10; B60W 2540/10; B60W 2550/142; B60W 2550/148; B60W 2710/1005; B60W 2550/10; B60K 17/36; B60K 17/08; B60K 17/16; B60K 17/06
See application file for complete search history.

(56) References Cited

U.S. PATENT DOCUMENTS 3,463,283 A 8/1969 Stow
3,477,439 A 11/1969 Hamouz et al.
(Continued)

FOREIGN PATENT DOCUMENTS

WO 0212757 A1 2/2002

OTHER PUBLICATIONS

Dana Holding Corporation article entitled "Spicer AdvanTEK Dual Range Disconnect™ Technology Combining the Reliability of 6×4 with the Efficiency of a 6×2 Configuration".

*Primary Examiner* — David J Hlavka
(74) *Attorney, Agent, or Firm* — Jeffrey P. Calfa; Mark C. Bach

(57) ABSTRACT

A forward rear drive axle of a vehicle having at least two rear drive axles has a multiple ratio gearbox and a power divider or inter-axle differential that can be connected to or disconnected from the rearward rear drive axle, so that the vehicle can be operated in 6×4 mode or in 6×2 mode. A control system is connected to the transmission and to the multiple ratio gearbox, and is configured to shift the gearbox sequentially through its ratios when the transmission is within a subset of its gear ratios chosen to maximize use of transmission gears exhibiting higher gear train efficiency. The control system is further configured to control the use of 6×4 mode or 6×2 mode independently from the shifting of the multiple ratio gearbox.

20 Claims, 2 Drawing Sheets

(51) Int. Cl.
- *B60K 17/36* (2006.01)
- *B60K 17/08* (2006.01)
- *B60K 17/16* (2006.01)
- *B60W 10/11* (2012.01)

(52) U.S. Cl.
CPC . *B60W 2550/148* (2013.01); *B60W 2710/021* (2013.01); *B60W 2710/1005* (2013.01)

(56) References Cited

U.S. PATENT DOCUMENTS

| | | |
|---|---|---|
| 3,513,714 A | 5/1970 | Jennings et al. |
| 3,513,717 A | 5/1970 | Lickey et al. |
| 3,534,607 A | 10/1970 | Selzer et al. |
| 4,662,489 A | 5/1987 | Honekamp et al. |
| 5,017,916 A | 5/1991 | Londt et al. |
| 5,365,436 A | 11/1994 | Schaller et al. |
| 5,853,348 A | 12/1998 | Lehman |
| 5,928,106 A | 7/1999 | Biros, Jr. et al. |
| 6,058,805 A | 5/2000 | Merkler |
| 6,173,622 B1 | 1/2001 | Carnevale et al. |
| 6,237,712 B1 | 5/2001 | Lehman et al. |
| 6,282,975 B1 | 9/2001 | Harrison et al. |
| 6,482,124 B2 | 11/2002 | Hormann et al. |
| 6,689,014 B2 | 2/2004 | Fleming et al. |
| 6,729,442 B2 | 5/2004 | Merkler et al. |
| 6,738,701 B2 | 5/2004 | Wilson |
| 7,139,653 B2 | 11/2006 | Ringger et al. |
| 7,640,823 B2 | 1/2010 | Bowman et al. |
| 7,703,570 B2 | 4/2010 | Ringger et al. |
| 8,986,150 B2 | 3/2015 | Versteyhe et al. |
| 9,725,095 B2 | 8/2017 | Carlson |
| 2006/0124374 A1* | 6/2006 | Katada ............... B60K 6/52 180/233 |
| 2006/0288969 A1 | 12/2006 | Thomas |
| 2009/0062998 A1* | 3/2009 | Ushiroda ............ B60W 10/119 701/69 |
| 2011/0082002 A1 | 4/2011 | Heath et al. |
| 2012/0085187 A1 | 4/2012 | Burns |
| 2012/0129648 A1* | 5/2012 | Isaacs ................ B60K 6/12 477/2 |
| 2013/0296131 A1* | 11/2013 | Mueller .............. F16D 48/06 477/35 |
| 2014/0129105 A1* | 5/2014 | Shigeta .............. B60K 17/35 701/69 |
| 2014/0130622 A1 | 5/2014 | Cassaday et al. |
| 2014/0244084 A1* | 8/2014 | Raftry ............... B60W 10/02 701/22 |
| 2015/0291152 A1* | 10/2015 | Mould ............... B60W 10/06 701/22 |
| 2016/0152238 A1* | 6/2016 | Mita ................. B60K 23/0808 180/197 |
| 2018/0154882 A1* | 6/2018 | Sasaki ............... B60K 17/046 |

* cited by examiner

MULTIPLE RANGE INDEPENDENTLY DISCONNECTING SMART AXLE

BACKGROUND

Field of Invention

Embodiments described herein generally relate to a Multiple Range Independently Disconnecting Smart Axle, and a system and method for the use thereof, that improves overall drivetrain efficiency by maximizing the use of one or more high efficiency transmission gear selections.

Related Art

A vehicle, such as a truck, a bus, and the like, is often provided with an engine, a transmission, and one or more drive axles. In order to provide support and traction, it is known to provide two or three rear drive axles, sometimes in conjunction with one or more non-driving axles, at the rear of the vehicle. In order to propel the vehicle, the engine produces rotational torque and power. The transmission receives rotational torque and power from the engine and is equipped with several gear ratios, in order to adapt the torque and power-producing characteristics of the engine to the propulsion and acceleration needs of the vehicle. The transmission then outputs the rotational torque and power to a propeller shaft, which delivers it to the one or more rear drive axles.

It is further known to provide a multiple range, or multiple ratio (the terms range and ratio being used interchangeably in this application), gearbox on the foremost driving rear axle, in order to further selectively alter the gear ratio between the engine and the driving axle. Following the multiple ratio gearbox, if present, a power divider or inter-axle differential may function to divide the rotational power between the foremost driving rear axle and any one or more subsequent driving rear axle. The power divider or inter-axle differential may be attached to the front driving rear axle, and may deliver power to the front driving rear axle by way of a direct connection, such as gearing, and may deliver power to the rearward driving rear axle by way of an inter-axle shaft. The power divider or inter-axle differential may further function to deliver rotational power to the front driving rear axle and to the rearward driving rear axle while compensating for any differences in rotational speed of between the front driving rear axle and the rearward driving rear axle. Additionally, the power divider or inter-axle differential may selectively couple or lock together the rotational speeds of the front driving rear axle and of the rearward driving rear axle, for example under low traction conditions.

Each of the frontward and rearward driving rear axles may additionally be provided with differential gears, in order to compensate for differences between the rotational speed of the wheels on one side of the vehicle and the rotational speed of the wheels on the other side of the vehicle, such as differences in rotational speed encountered when the vehicle turns. Each of these differential gears of the frontward and rearward driving rear axles may further be provided with locks or couplings that constrain the wheels on one side of the vehicle and the wheels on the other side of the vehicle to rotate at the same speed, for example under low traction conditions.

It is further known to provide a mechanism that selectively connects or disconnects the power divider or inter-axle differential from the inter-axle shaft, and/or selectively connects or disconnects the inter-axle shaft from the rearward driving rear axle, so that power is selectively delivered to both the front driving rear axle and the rearward driving rear axle, or only to the front driving rear axle. A vehicle having this feature and configuration may be said to be operable both in 6×4 mode wherein both the front driving rear axle and the rearward driving rear axle receive power, and in 6×2 mode wherein only the front driving rear axle receives power. For example, such a vehicle may select 6×4 mode at startup, on grades, at low speeds, during backup maneuvering, or under other conditions where additional traction is needed, and may select 6×2 mode for highway cruise operation. It is further known to use the multiple ratio gearbox on the foremost driving rear axle to select a gear ratio that results in lowered engine speed at the same time that the mechanism selectively disconnects the power divider or inter-axle differential from the inter-axle shaft and/or selectively disconnects the inter-axle shaft from the rearward driving rear axle.

However, by correlating the selection of a multiple ratio gearbox gear ratio that results in lowered engine speed directly solely to the selective disconnection of the power divider or inter-axle differential from the inter-axle shaft and/or the selective disconnection of the inter-axle shaft from the rearward driving rear axle, such arrangements fail to fully exploit and maximize potential transmission efficiencies. Accordingly, there is an unmet need for a system and method for improving overall drivetrain efficiency by maximizing the use of one or more high efficiency transmission gear selections.

SUMMARY

Embodiments described herein relate to a Multiple Range (or N-Range) Independently Disconnecting Smart Axle, and a system and method for the use thereof, that improves overall drivetrain efficiency by maximizing the use of one or more high efficiency transmission gear selections. The Multiple Range Independently Disconnecting Smart Axle may be applied to various types of vehicles, such as highway or semi-tractors, straight trucks, busses, fire trucks, agricultural vehicles, and etceteras. The several embodiments of the Multiple Range Independently Disconnecting Smart Axle System presented herein are employed on vehicles having traditional ladder frame and rigid axles as examples, but this is not to be construed as limiting the scope of the Multiple Range Independently Disconnecting Smart Axle, and system and method for the use thereof, which may be applied to vehicles and axle/suspension systems of differing construction. The several embodiments of the Multiple Range Independently Disconnecting Smart Axle System presented herein are further employed on vehicles having internal combustions engines, but this too is not to be construed as limiting the scope of the Multiple Range Independently Disconnecting Smart Axle, and a system and method for the use thereof, which may be used vehicle propulsion systems using other types of prime movers, such as electric, pneumatic, or hydraulic traction motors.

An exemplary embodiment of a vehicle having a Multiple Range Independently Disconnecting Smart Axle has an engine, a transmission, a front non-driving axle, and two rear drive axles. The transmission transmits rotational torque and power produced by the engine to the forward rear drive axle by way of a driveshaft. The forward rear drive axle is provided with a multiple ratio gearbox that may, as non-limiting examples, be a two or three speed gearbox. The multiple ratio gearbox is connected to a power divider or inter-axle differential, which divides the rotational power between the forward rear drive axle and the rearward rear drive axle. The power divider or inter-axle differential transmits power to the forward rear drive axle by way of gearing, and to the rearward rear drive axle by way of an inter-axle shaft. At least one mechanism selectively connects or disconnects the power divider or inter-axle differential from the inter-axle shaft, and/or selectively connects or disconnects the inter-axle shaft from the rearward driving rear axle, so that power is selectively delivered to both the forward rear drive axle and the rearward rear drive axle, or only to the forward rear drive axle. The at least one mechanism that selectively connects or disconnects the inter-axle shaft from the rearward driving rear axle may function by selectively connecting or disconnecting the inter-axle shaft from the ring gear of the differential of the rearward driving rear axle. The transmission is equipped with several gear ratios that adapt the torque and power-producing characteristics of the engine to the propulsion and acceleration needs of the vehicle. Due to certain characteristics of gear trains, such as frictional losses, lower gears of the transmission, or those having a greater reduction ratio, tend to exhibit lower gear train efficiency. Higher gears of the transmission, or those having a lower reduction ratio, tend to exhibit higher gear train efficiency. When the transmission is in direct drive, such that the input to output ratio is one to one, the transmission exhibits very good gear train efficiency.

A control system is connected to the multiple ratio gearbox of the forward rear drive axle and to the at least one mechanism that selectively connects or disconnects the power divider or inter-axle differential from the inter-axle shaft, and/or selectively connects or disconnects the inter-axle shaft from the rearward driving rear axle. The control system may further be connected to the transmission, to the engine, and/or to other subsystems of the vehicle. The control system may be incorporated directly into the forward rear drive axle, or into the multiple ratio gearbox thereof, or may be otherwise located on the vehicle. The control system is configured to shift the multiple ratio gearbox sequentially through its gear ratios when the transmission is in each of a certain subset of its gears. The subset of the gears of the transmission in which the control system is configured to shift the multiple ratio gearbox sequentially through its gear ratios may be selected from the higher gears of the transmission, and may include direct drive and/or any overdrive gear ratios of the transmission, based on their higher gear train efficiency. Determination of the gear efficiency of the gears of the transmission may be accomplished empirically, such as through the use of torque sensors or other sensors, or may be determined using application of design theory, such as through the use of calculations and/or look-up tables. The control system may be configured to influence or control shifting of the transmission, or may passively receive information from the transmission and shift the multiple ratio gearbox accordingly.

The subset of the gears of the transmission in which the control system is configured to shift the multiple ratio gearbox sequentially through its gear ratios may include several higher gears of the transmission based on their good gear train efficiency, or may include only direct drive, based on its very good gear train efficiency. Further, the control system may be configured to vary the subset of gears of the transmission in which it shifts the multiple ratio gearbox sequentially through its gear ratios based on certain conditions, such as commanded acceleration, vehicle weight, gradient, or other vehicular or environmental conditions. The control system may further be configured to vary the subset of gears of the transmission in which it shifts the multiple ratio gearbox sequentially through its gear ratios, in order to maximize gear train efficiency. Selection of the subset of gears may depend upon an instantaneous calculation of gear train efficiency, be based on a look-up table, or be based on a learning algorithm, which may include factors such as operator driving characteristics. Further, if the multiple ratio gearbox of the forward rear drive axle is provided with more than two, for example three, gears, the control system may be configured to shift the multiple ratio gearbox fully sequentially through all of its gear ratios when the transmission is within its subset of gears in which the control system is configured to shift the multiple ratio gearbox, or may be configured to shift the multiple ratio gearbox sequentially through less than all of its gear ratios in one or more of the transmission gears within the subset of gears in which the control system is configured to shift the multiple ratio gearbox.

The control system is further configured to control the at least one mechanism that selectively connects or disconnects the power divider or inter-axle differential from the inter-axle shaft, and/or selectively connects or disconnects the inter-axle shaft from the rearward driving rear axle, in such a way that connection or disconnection of the power divider or inter-axle differential from the inter-axle shaft and/or the inter-axle shaft from the rearward driving rear axle is independent from the shifting of the multiple ratio gearbox. Specifically, when under acceleration, the control system may control the at least one mechanism that selectively connects or disconnects the power divider or inter-axle differential from the inter-axle shaft, and/or selectively connects or disconnects the inter-axle shaft from the rearward driving rear axle, to disconnect the power divider or inter-axle differential from the inter-axle shaft and/or the inter-axle shaft from the rearward driving rear axle before, at the same time as, or after shifting the multiple ratio gearbox sequentially through its gear ratios when the transmission is in each of a certain subset of its gears.

The control system may control the at least one mechanism that selectively connects or disconnects the power divider or inter-axle differential from the inter-axle shaft, and/or selectively connects or disconnects the inter-axle shaft from the rearward driving rear axle, based on certain conditions, such as road conditions, available traction, gradient, speed, and rate of acceleration, as non-limiting examples. Specifically, the control system may control the at least one mechanism to selectively connect the power divider or inter-axle differential to the inter-axle shaft, and/or selectively connect the inter-axle shaft to the rearward driving rear axle, under low speed (for example less than eleven miles per hour), low traction, steep gradient, and/or high acceleration. Conversely, the control system may control the at least one mechanism to selectively disconnect the power divider or inter-axle differential to the inter-axle shaft, and/or selectively disconnect the inter-axle shaft to the rearward driving rear axle, under increased speed, normal traction, level gradient, and/or low acceleration conditions. Alternately, the control system may control the at least one mechanism that selectively connects or disconnects the power divider or inter-axle differential from the inter-axle shaft, and/or selectively connects or disconnects the inter-axle shaft from the rearward driving rear axle, based on a predetermined schedule, which again is independent from the shifting of the multiple ratio gearbox, and may be before, at the same time as, or after shifting the multiple ratio gearbox.

In a non-limiting exemplary embodiment, the control system may begin an acceleration sequence with the at least one mechanism causing the power divider or inter-axle differential to be connected to the inter-axle shaft and/or the inter-axle shaft to be connected to the rearward driving rear axle, with the multiple ratio gearbox of the forward rear drive axle in high gear, and with the transmission in first gear. The transmission may then proceed for example from first to second gear, and from second to third gear, at which point the control system may determine that conditions are appropriate to disconnect the power divider or inter-axle differential from the inter-axle shaft and/or the inter-axle shaft from the rearward driving rear axle. Thereafter, the transmission may proceed from third gear, to fourth gear, and so on, until reaching for example eighth gear, which may, for the sake of illustration, be one gear lower than direct drive.

In eighth gear, the control system of the present exemplary embodiment may command the multiple ratio gearbox of the forward rear drive axle to shift into a lower gear, and then subsequently shift back into high gear. In this way, the transmission transmits power in eighth gear, which may exhibit higher gear train efficiency, during a greater proportion of the acceleration sequence. Similarly, in ninth gear, which in this illustrative embodiment may be direct drive, the control system may again command the multiple ratio gearbox of the forward rear drive axle to shift into a lower gear, and then subsequently shift back into high gear, so that the transmission transmits power in ninth gear, which being direct drive exhibits very good gear train efficiency, during a greater proportion of the acceleration sequence. In tenth gear, which in this illustrative embodiment may be an overdrive gear, the control system may command the multiple ratio gearbox of the forward rear drive axle to remain in high gear, rather than shifting into a lower gear and subsequently back into high gear, depending upon, for example, the gear train efficiency of tenth gear as calculated based on commanded acceleration, vehicle weight, gradient, or other vehicular or environmental conditions.

In an alternate embodiment, the control system may command the multiple ratio gearbox of the forward rear drive axle to shift into a lower gear, and then subsequently shift back into high gear, only when the transmission is in direct drive. In yet another alternate embodiment, in which the multiple ratio gearbox of the forward rear drive axle is provided with three gears, the control system may command the multiple ratio gearbox to shift into low gear when the transmission enters eighth gear, and then subsequently shift into medium gear. The control system may then command the multiple ratio gearbox to shift into low gear when the transmission enters ninth gear, then shift into medium gear, and then shift into high gear, while the transmission remains in ninth gear, or direct drive. Finally, the control system may then command the multiple ratio gearbox to shift into medium gear when the transmission enters tenth gear or overdrive, and ultimately shift into high gear. Such permutations are contemplated as being within the scope of operable configurations of the control system of the Multi Range Independently Disconnecting Smart Axle.

According to one embodiment of the Multi Range Independently Disconnecting Smart Axle System, a vehicle has a prime mover and a transmission connected to the prime mover. The transmission has at least two transmission gear ratios and is operable to transmit power produced by the prime mover to a multiple ratio gearbox of a first drive axle. The multiple ratio gearbox is connected to a power divider or inter-axle differential, which is operable to transmit power from the multiple ratio gearbox to the first drive axle and to at least one additional drive axle. At least one mechanism is operable to selectively connect or disconnect the power divider or inter-axle differential from the at least one additional drive axle. A control system is connected to the transmission, to the multiple ratio gearbox, and to the at least one mechanism. The control system is configured to shift the multiple ratio gearbox sequentially through at least two gearbox ratios when the transmission is within a subset of the at least two transmission gear ratios. The control system is further configured to control the at least one mechanism independently from the shifting of the multiple ratio gearbox.

According to another embodiment of the Multi Range Independently Disconnecting Smart Axle System, a multiple ratio independently disconnecting drive axle is used in a vehicle having a prime mover and a transmission having at least two transmission gear ratios connected to the prime mover. The multiple ratio independently disconnecting drive axle includes a multiple ratio gearbox that receives power from the transmission. A power divider or inter-axle differential is connected to the multiple ratio gearbox and is operable to transmit power from the multiple ratio gearbox to the multiple ratio independently disconnecting drive axle and to at least one additional drive axle. At least one mechanism is operable to selectively connect or disconnect the power divider or inter-axle differential from the at least one additional drive axle. A control system is connected to the transmission, to the multiple ratio gearbox, and to the at least one mechanism. The control system is configured to shift the multiple ratio gearbox sequentially through at least two gearbox ratios when the transmission is within a subset of the at least two transmission gear ratios. The control system is further configured to control the at least one mechanism independently from the shifting of the multiple ratio gearbox.

According to another embodiment of the Multi Range Independently Disconnecting Smart Axle System used in a vehicle having a prime mover and a transmission having at least two transmission gear ratios connected to the prime mover, a method includes several steps. The first step is receiving power from the transmission by way of a multiple ratio gearbox. The second step is connecting a power divider or inter-axle differential to the multiple ratio gearbox and transmitting power from the multiple ratio gearbox to the multiple ratio independently disconnecting drive axle and to at least one additional drive axle. The third step is selectively connecting or disconnecting the power divider or inter-axle differential from the at least one additional drive axle using at least one mechanism. The fourth step is connecting a control system to the transmission, to the multiple ratio gearbox, and to the at least one mechanism. The fifth step is configuring the control system to shift the multiple ratio gearbox sequentially through at least two gearbox ratios when the transmission is within a subset of the at least two transmission gear ratios. The sixth step is configuring the control system to control the at least one mechanism independently from the shifting of the multiple ratio gearbox.

In this way, the Multi Range Independently Disconnecting Smart Axle, and the system and method for the use thereof, improves overall drivetrain efficiency by maximizing the use of one or more high efficiency transmission gear selections, while independently providing extra traction by way of operation in 6×4 mode when needed and minimizing drivetrain losses by way of operation in 6×2 mode when appropriate. This results in improved fuel economy and lowered overall vehicle exhaust emissions.

DESCRIPTION OF THE DRAWINGS

The above-mentioned and other features of embodiments of the Multi Range Independently Disconnecting Smart Axle, and the system and method for the use thereof, will become more apparent and will be better understood by reference to the following description of embodiments of the Multi Range Independently Disconnecting Smart Axle taken in conjunction with the accompanying drawings, wherein.

Corresponding reference numbers indicate corresponding parts throughout the several views. The exemplifications set out herein illustrate embodiments of a Multi Range Independently Disconnecting Smart Axle, and the system and method for the use thereof, and such exemplifications are not to be construed as limiting the scope of the claims in any manner.

DETAILED DESCRIPTION

Figure 1:
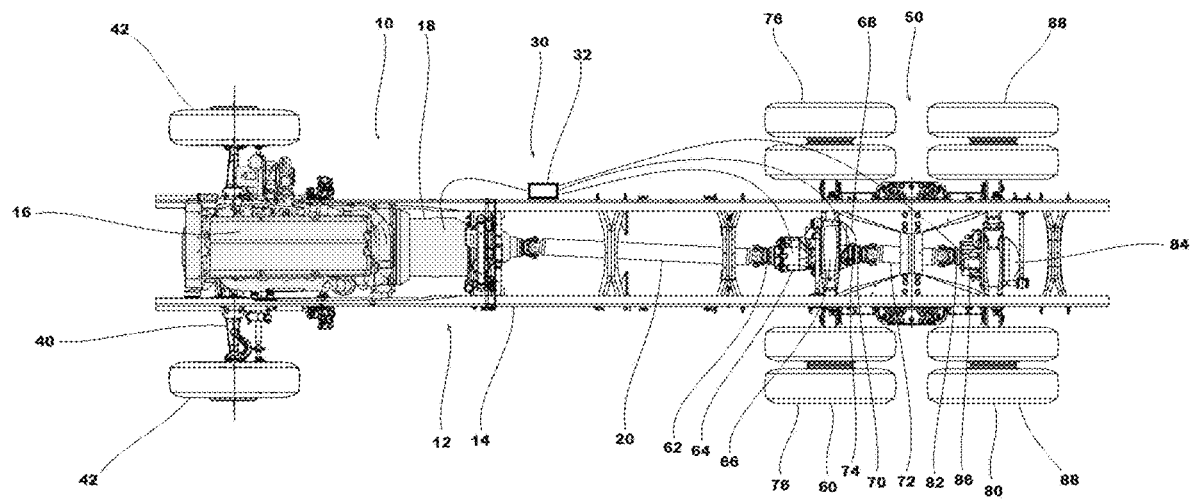
FIG. 1 is a plan view of an embodiment of a Multi Range Independently Disconnecting Smart Axle System, as described herein.

Referring now to FIG. 1, a plan view of an embodiment of a Multi Range Independently Disconnecting Smart Axle System is shown. A vehicle 10 has a chassis 12 made of a frame 14 in which an engine 16 and transmission 18 are installed. The chassis 14 is provided with a front axle 40, which may be a driven or non-driven axle, to which front wheels 42 are attached. The chassis 14 is further provided with a rear tandem axle assembly 50, which could in an alternate embodiment also be a rear triple axle assembly. The rear tandem axle assembly 50 shown in FIG. 1 is made up of a forward rear drive axle 60 having forward rear wheels 76 and a rearward rear drive axle 80 having rearward rear wheels 88.

As noted previously, the transmission 18 transmits rotational torque and power produced by the engine 16 to the forward rear drive axle 60 by way of a driveshaft 20. The transmission 18 is equipped with several gear ratios (not shown) that adapt the torque and power-producing characteristics of the engine 16 to the propulsion and acceleration needs of the vehicle 10. The forward rear drive axle 60 is provided with a multiple ratio gearbox 64 that may, as non-limiting examples, be a two or three speed gearbox. The multiple ratio gearbox 64 is provided with a forward rear drive axle input 62 by which rotational power and torque is received from the driveshaft 20. The multiple ratio gearbox 64 is connected to a power divider or inter-axle differential 66, which divides the rotational power between the forward rear drive axle 60 and the rearward rear drive axle 80. The multiple ratio gearbox 64 may deliver a divided portion of the rotational power directly to the forward rear drive axle differential 68 of the forward rear drive axle 60.

The power divider or inter-axle differential 66 further transmits a divided portion of the rotational power to the rearward rear drive axle 80 by way of a forward rear drive axle output 70 and an inter-axle shaft 72. The rearward rear drive axle 80 receives rotational power from the inter-axle shaft 72 by way of a rearward rear drive axle input 82, which is connected to the rearward rear drive axle differential 84 of the rearward rear drive axle 80. At least one mechanism 74 selectively connects or disconnects the power divider or inter-axle differential 66 from the inter-axle shaft 72, and/or at least one mechanism 86 selectively connects or disconnects the inter-axle shaft 72 from the rearward driving rear axle 80, so that power is selectively delivered to both the forward rear drive axle 60 and the rearward rear drive axle 80, or only to the forward rear drive axle 60. The at least one mechanism 86 that selectively connects or disconnects the inter-axle shaft 72 from the rearward driving rear axle 80 may function by disconnecting the rearward rear drive axle input 82 from the ring gear (not shown) of the rearward rear drive axle differential 84 of the rearward rear drive axle 80.

As noted previously, a control system 30 including a controller 32 is connected to the multiple ratio gearbox 64 of the forward rear drive axle 60 and to the at least one mechanism 74 that selectively connects or disconnects the power divider or inter-axle differential 66 from the inter-axle shaft 72, and/or to the at least one mechanism 86 that selectively connects or disconnects the inter-axle shaft 72 from the rearward driving rear axle 80. The controller 32 of the control system 30 may further be connected to the transmission 18, to the engine 16, and/or to other subsystems of the vehicle 10. The controller 32 of the control system 30 may be incorporated directly into the forward rear drive axle 60, or into the multiple ratio gearbox 64 thereof, or may be otherwise located on the vehicle 10. The controller 32 of the control system 30 is configured to shift the multiple ratio gearbox 64 sequentially through its gear ratios when the transmission 18 is in each of a certain subset of its gears.

As noted previously, the controller 32 of the control system 30 is configured to shift the multiple ratio gearbox 64 sequentially through its gear ratios when the transmission 18 is in each of a certain subset of its gears. The controller 32 of the control system 30 may again be configured to influence or control shifting of the transmission 18, or may passively receive information from the transmission 18 and shift the multiple ratio gearbox 64 accordingly. The controller 32 of the control system 30 is further configured to control the at least one mechanism 74 that selectively connects or disconnects the power divider or inter-axle differential 66 from the inter-axle shaft 72, and/or the at least one mechanism 86 that selectively connects or disconnects the inter-axle shaft 72 from the rearward driving rear axle 80.

Figure 2:
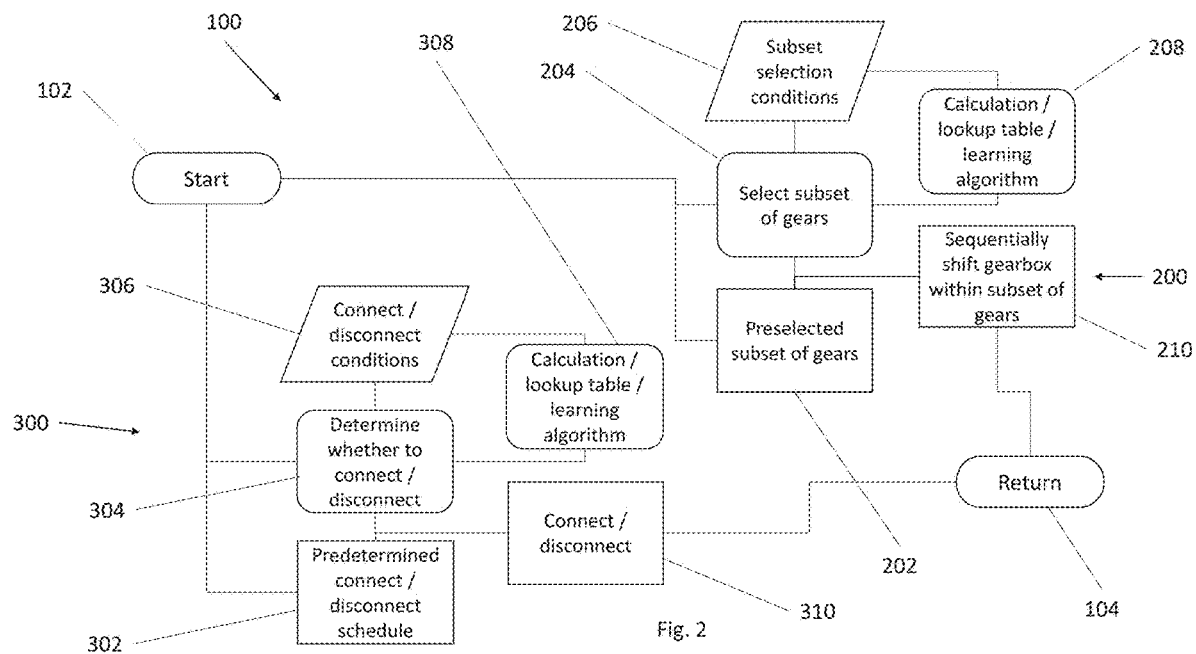
FIG. 2 is a flowchart diagram of an embodiment of a Multi Range Independently Disconnecting Smart Axle System, as described herein.

FIG. 2 shows a flowchart diagram of an embodiment of the Multi Range Independently Disconnecting Smart Axle System. The controller 32 of the control system 30 (not shown in FIG. 2) is configured to take several process steps 100 starting at 102 to maximize the use of one or more high efficiency transmission gear selections and to independently provide extra traction by way of operation in 6×4 mode when needed and minimize drivetrain losses by way of operation in 6×2 mode when appropriate. In a first subset of process steps 200, the controller 32 of control system 30 determines at step 202 that the transmission 18 (not shown in FIG. 2) has shifted to one of a preselected subset of the gears of the transmission 18 in which the control system 30 is configured to shift the multiple ratio gearbox 64 sequentially through its gear ratios. As noted previously, the preselected subset of the gears of the transmission 18 in which the controller 32 of the control system 30 is configured to shift the multiple ratio gearbox 64 (not shown in FIG. 2) sequentially through its gear ratios may be selected from the higher gears of the transmission 18, and may include direct drive and/or any overdrive gear ratios of the transmission 18. Again, the subset of the gears of the transmission 18 may include several higher gears of the transmission 18, or may include only direct drive.

In an alternate step 204, the controller 32 of the control system 30 may determine the subset of gears of the transmission 18 in which it will shift the multiple ratio gearbox 64 sequentially through its gear ratios based on certain conditions received at step 206, such as commanded acceleration, vehicle weight, gradient, or other vehicular or environmental conditions, or combinations thereof. The controller 32 of the control system 30 may optionally determine at alternate step 208 the subset of gears using an instantaneous calculation of gear train efficiency, using a look-up table, or using a learning algorithm, which may include factors such as operator driving characteristics. At step 210, the controller 32 of the control system 30 implements the first subset of process steps 200 by sequentially shifting the multiple ratio gearbox 64 through its gear ratios. As noted previously, if the multiple ratio gearbox 64 is provided with more than two gears, the controller 32 of the control system 30 may be configured to shift the multiple ratio gearbox 64 fully sequentially through all of its gear ratios, or may be configured to shift the multiple ratio gearbox 64 sequentially through less than all of its gear ratios in one or more of the transmission gears within the subset of gears.

In a second subset of process steps 300, the controller 32 of control system 30 determines at step 302 that the vehicle 10 (not shown in FIG. 2) is moving at a velocity indicated in a predetermined schedule at which connection or disconnection of the power divider or inter-axle differential 66 from the inter-axle shaft 72 and/or the inter-axle shaft 72 from the rearward driving rear axle 80 (not shown in FIG. 2) is to be performed. In an alternate step 304, the controller 32 of control system 30 may determine the schedule at which connection or disconnection of the power divider or inter-axle differential 66 from the inter-axle shaft 72 and/or the inter-axle shaft 72 from the rearward driving rear axle 80 is to take place based on certain conditions received at step 306, such as road conditions, available traction, gradient, speed, and rate of acceleration. The controller 32 of the control system 30 may optionally determine at alternate step 308 the schedule at which connection or disconnection of the power divider or inter-axle differential 66 from the inter-axle shaft 72 and/or the inter-axle shaft 72 from the rearward driving rear axle 80 is to take place by applying the conditions received at step 306 to an instantaneous calculation, to a look-up table, or to a learning algorithm.

At step 310, the controller 32 of the control system 30 implements the first subset of process steps 300 by controlling the at least one mechanism 74 (not shown in FIG. 2) that selectively connects or disconnects the power divider or inter-axle differential 66 from the inter-axle shaft 72, and/or the at least one mechanism 86 (not shown in FIG. 2) that selectively connects or disconnects the inter-axle shaft 72 from the rearward driving rear axle 80. Each of step 202, wherein the controller 32 of control system 30 determines that the transmission 18 has shifted to one of a preselected subset of its gears, and/or alternate step 204, wherein the controller 32 of control system 30 determines the subset of gears based on certain conditions received at step 206, is fully independent of step 302, wherein the controller 32 of control system 30 determines that the vehicle 10 is moving at a velocity indicated in a predetermined connect/disconnect schedule, and/or alternate step 304, wherein the controller 32 of control system 30 determines the connect/disconnect schedule based on certain conditions received at step 306. In this way, the controller 32 of control system 30 implementing the process 100 may disconnect the power divider or inter-axle differential 66 from the inter-axle shaft 72 and/or the inter-axle shaft 72 from the rearward driving rear axle 80 before, at the same time as, or after shifting the multiple ratio gearbox 64 sequentially through its gear ratios when the transmission 18 is in each of the aforementioned subset of its gears.

At step 104, the process 100 returns to step 102, and the process 100 repeats. In this way, the Multi Range Independently Smart Axle System and Method is able to maximize the use of one or more high efficiency transmission gear selections and to independently provide extra traction by way of operation in 6×4 mode when needed and minimize drivetrain losses by way of operation in 6×2 mode when appropriate.

While the Multi Range Independently Smart Axle System and Method has been described with respect to at least one embodiment, the Multi Range Independently Smart Axle System and Method can be further modified within the spirit and scope of this disclosure. This application is therefore intended to cover any variations, uses, or adaptations of the Multi Range Independently Smart Axle System and Method using its general principles. Further, this application is intended to cover such departures from the present disclosure as come within known or customary practice in the art to which the disclosure pertains and which fall within the limits of the appended claims.

REFERENCE NUMBER LISTING

| | |
|---|---|
| 10 | Vehicle |
| 12 | Chassis |
| 14 | Frame |
| 16 | Engine |
| 18 | Transmission |
| 20 | Driveshaft |
| 30 | Control system |
| 32 | Controller |
| 40 | Front drive/non-drive axle |
| 42 | Front wheels |
| 50 | Rear tandem/triple axle assembly |
| 60 | Forward rear drive axle |
| 62 | Forward rear drive axle input |
| 64 | Forward rear drive axle multiple ratio gear box |
| 66 | Inter-Axle differential/power divider |
| 68 | Forward rear drive axle differential |
| 70 | Forward rear drive axle output |
| 72 | Inter-axle shaft |
| 74 | Inter-axle shaft power divider disconnect mechanism |
| 76 | Forward rear wheels |
| 80 | Rearward rear drive axle |
| 82 | Rearward rear drive axle input |
| 84 | Rearward rear drive axle differential |
| 86 | Inter-axle shaft rearward rear drive axle disconnect mechanism |
| 88 | Rearward rear wheels |
| 100 | process steps |
| 102 | start step |
| 104 | return step |
| 200 | $1^{st}$ subset of process steps |
| 202 | determination step |
| 204 | alternate determination step |
| 206 | conditions step |
| 208 | alternate condition evaluation step |
| 210 | implementation step |
| 300 | $2^{nd}$ subset of process steps |
| 302 | determination step |
| 304 | alternate determination step |
| 306 | conditions step |
| 308 | alternate condition evaluation step |
| 310 | implementation step |

What is claimed is:

1. A vehicle, comprising:
 a prime mover,
 a transmission connected to prime mover, the transmission having at least two transmission gear ratios;

the transmission being operable to transmit power produced by the prime mover to a multiple ratio gearbox of a first drive axle;

the multiple ratio gearbox being connected to a power divider or inter-axle differential;

the power divider or inter-axle differential being operable to transmit power from the multiple ratio gearbox to the first drive axle and to at least one additional drive axle;

at least one mechanism being operable to selectively connect or disconnect the power divider or inter-axle differential from the at least one additional drive axle;

a control system connected to the transmission, to the multiple ratio gearbox, and to the at least one mechanism, the control system being configured to shift the multiple ratio gearbox sequentially through at least two gearbox ratios when the transmission is within a subset of the at least two transmission gear ratios; and the control system being further configured to control the at least one mechanism independently from the shifting of the multiple ratio gearbox.

2. The vehicle of claim 1, wherein:
the subset of the at least two transmission gear ratios includes a direct drive gear.

3. The vehicle of claim 1, wherein:
the subset of the at least two transmission gear ratios being selected based on gear train efficiency.

4. The vehicle of claim 1, wherein:
the control system being further configured to control the at least one mechanism based on at least one of: a predetermined schedule, road conditions, available traction, gradient, speed, and rate of acceleration.

5. The vehicle of claim 1, wherein:
the multiple ratio gearbox having at least three ratios; and
the control system being further configured to shift the multiple ratio gearbox sequentially through at least one of:
  all of its gearbox ratios when the transmission is within each of the subset of the at least two transmission gear ratios, and
  at least one subset of its gearbox ratios when the transmission is within in at least one of the transmission gears within the subset of the at least two transmission gear ratios.

6. The vehicle of claim 1, wherein:
the power divider or inter-axle differential being operable to transmit power to the at least one additional drive axle by way of an inter-axle shaft; and
the at least one mechanism further comprises:
  at least one first mechanism operable to selectively connect or disconnect the power divider or inter-axle differential from the inter-axle shaft, and
  at least one second mechanism operable to selectively connect or disconnect the inter-axle shaft from the at least one additional drive axle.

7. The vehicle of claim 1, wherein:
the control system being further configured to control shifting of the transmission.

8. The vehicle of claim 1, wherein:
the control system being configured to vary the subset of the at least two transmission gear ratios based on at least one of: commanded acceleration, vehicle weight, gradient, at least one vehicular condition, and at least one environmental condition; and selection of the subset of the at least two transmission gear ratios depending upon at least one of: an instantaneous calculation of gear train efficiency, a look-up table, and a learning algorithm.

9. A multiple ratio independently disconnecting drive axle of a vehicle having a prime mover and a transmission having at least two transmission gear ratios connected to the prime mover, comprising:

a multiple ratio gearbox receiving power from the transmission;

a power divider or inter-axle differential connected to the multiple ratio gearbox and being operable to transmit power from the multiple ratio gearbox to the multiple ratio independently disconnecting drive axle and to at least one additional drive axle;

at least one mechanism being operable to selectively connect or disconnect the power divider or inter-axle differential from the at least one additional drive axle;

a control system connected to the transmission, to the multiple ratio gearbox, and to the at least one mechanism, the control system being configured to shift the multiple ratio gearbox sequentially through at least two gearbox ratios when the transmission is within a subset of the at least two transmission gear ratios; and the control system being further configured to control the at least one mechanism independently from the shifting of the multiple ratio gearbox.

10. The multiple ratio independently disconnecting drive axle of claim 9, wherein:
the subset of the at least two transmission gear ratios includes a direct drive gear.

11. The multiple ratio independently disconnecting drive axle of claim 9, wherein:
the subset of the at least two transmission gear ratios being selected based on gear train efficiency.

12. The multiple ratio independently disconnecting drive axle of claim 9, wherein:
the control system being further configured to control the at least one mechanism based on at least one of: a predetermined schedule, road conditions, available traction, gradient, speed, and rate of acceleration.

13. The multiple ratio independently disconnecting drive axle of claim 9, wherein:
the multiple ratio gearbox having at least three ratios; and
the control system being further configured to shift the multiple ratio gearbox sequentially through at least one of:
  all of its gearbox ratios when the transmission is within each of the subset of the at least two transmission gear ratios, and
  at least one subset of its gearbox ratios when the transmission is within in at least one of the transmission gears within the subset of the at least two transmission gear ratios.

14. The multiple ratio independently disconnecting drive axle of claim 9, wherein:
the control system being further configured to control shifting of the transmission.

15. The multiple ratio independently disconnecting drive axle of claim 9, wherein:
the control system being configured to vary the subset of the at least two transmission gear ratios based on at least one of: commanded acceleration, vehicle weight, gradient, at least one vehicular condition, and at least one environmental condition; and selection of the subset of the at least two transmission gear ratios depending upon at least one of: an instantaneous calculation of gear train efficiency, a look-up table, and a learning algorithm.

16. A method of controlling a multiple ratio independently disconnecting drive axle of a vehicle having a prime mover and a transmission having at least two transmission gear ratios connected to the prime mover, comprising:

receiving power from the transmission by way of a multiple ratio gearbox;

connecting a power divider or inter-axle differential to the multiple ratio gearbox and transmitting power from the multiple ratio gearbox to the multiple ratio independently disconnecting drive axle and to at least one additional drive axle;

selectively connecting or disconnecting the power divider or inter-axle differential from the at least one additional drive axle using at least one mechanism;

connecting a control system to the transmission, to the multiple ratio gearbox, and to the at least one mechanism, configuring the control system to shift the multiple ratio gearbox sequentially through at least two gearbox ratios when the transmission is within a subset of the at least two transmission gear ratios; and configuring the control system to control the at least one mechanism independently from the shifting of the multiple ratio gearbox.

17. The method of claim 16, wherein:
the subset of the at least two transmission gear ratios includes a direct drive gear; and
the subset of the at least two transmission gear ratios is selected based on gear train efficiency.

18. The method of claim 16, further comprising:
configuring the control system to control the at least one mechanism based on at least one of: a predetermined schedule, road conditions, available traction, gradient, speed, and rate of acceleration.

19. The method of claim 16, further comprising:
configuring the control system to control shifting of the transmission.

20. The method of claim 16, further comprising:
configuring the control system to vary the subset of the at least two transmission gear ratios based on at least one of: commanded acceleration, vehicle weight, gradient, at least one vehicular condition, and at least one environmental condition; and selecting the subset of the at least two transmission gear ratios based upon at least one of: an instantaneous calculation of gear train efficiency, a look-up table, and a learning algorithm.

* * * * *